May 5, 1953 H. L. DAVIS 2,637,354
CARCASS SPLITTER
Filed Sept. 13, 1948 2 SHEETS—SHEET 1
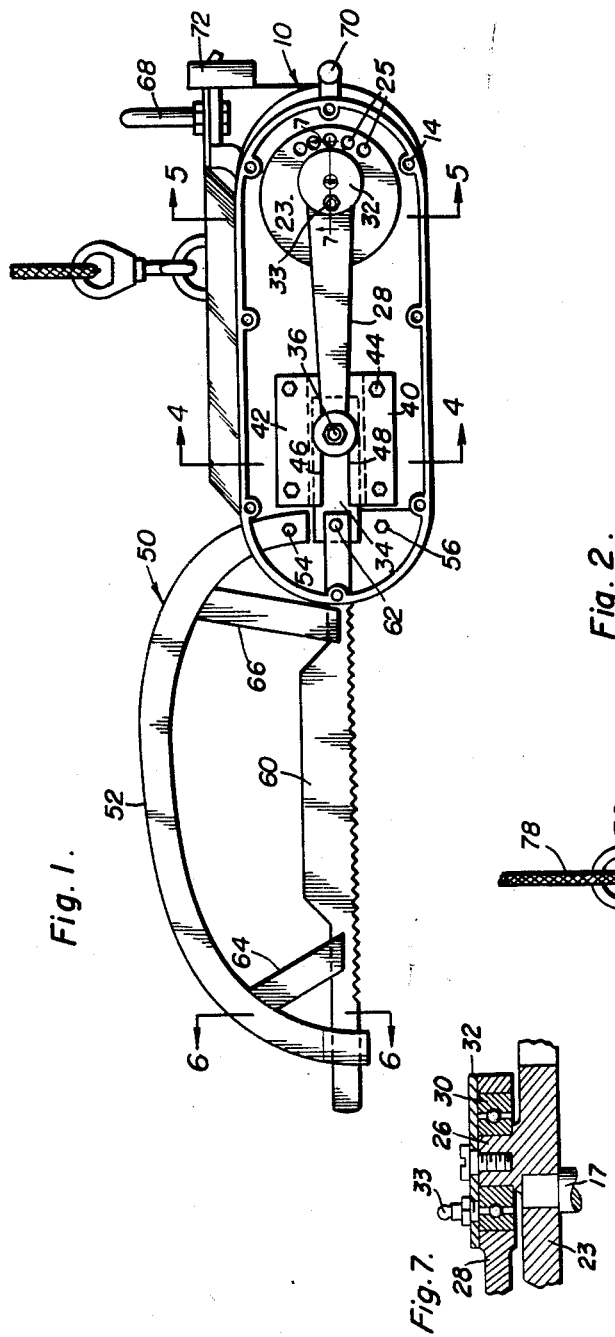
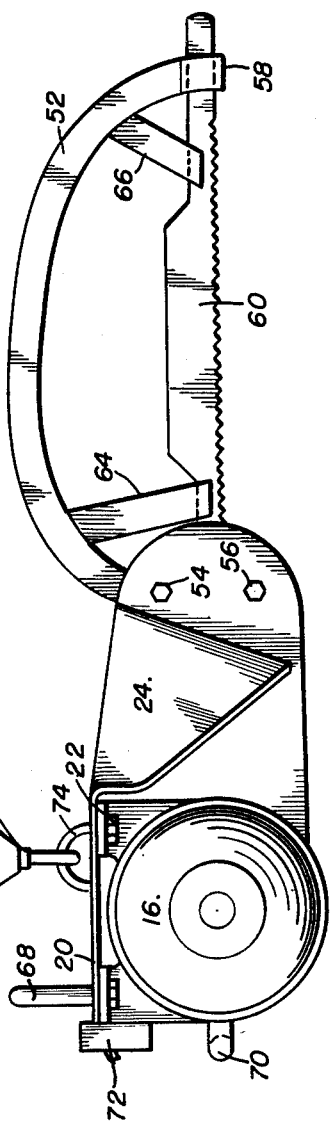
Howard L. Davis
INVENTOR.

May 5, 1953      H. L. DAVIS      2,637,354
CARCASS SPLITTER
Filed Sept. 13, 1948      2 SHEETS—SHEET 2
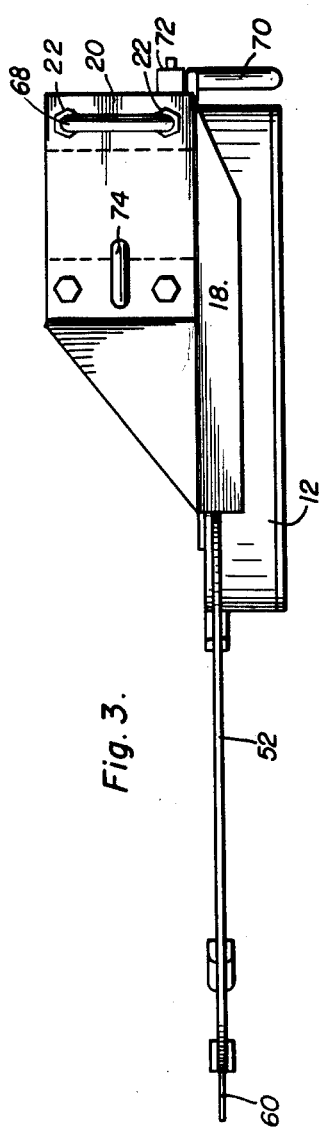
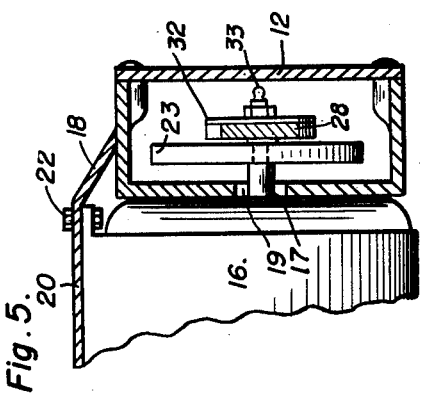
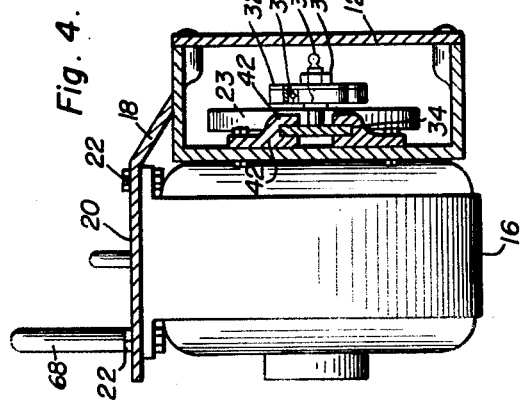
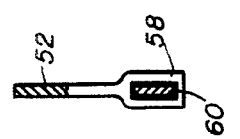
Howard L. Davis
INVENTOR.

Patented May 5, 1953

2,637,354

UNITED STATES PATENT OFFICE 2,637,354

CARCASS SPLITTER

Howard L. Davis, Payette, Idaho

Application September 13, 1948, Serial No. 48,990

3 Claims. (Cl. 143—63)

This invention relates to new and useful improvements in carcass splitting machines and has for its primary object to provide a power driven saw which may be driven by any conventional electric motor and which may be easily and conveniently manipulated in a safe and efficient manner by an inexperienced operator.

Another important object of this invention is to provide a power driven hand saw that is designed in a manner to be suspended from a flexible supporting means so that the forward or lead end of the saw is inclined forwardly and downwardly, so that an operator merely has to guide the saw in its movement and does not have to place any weight thereupon.

Another object of this invention is to provide novel means for supporting a reciprocating saw so that vibration is eliminated and the saw blade is securely retained to avoid breakage and obtain a maximum use thereof.

These and ancillary objects and various structural features of merit are attained by this invention, a preferred embodiment of which is set forth in the following description and illustrated in the accompanying drawings, wherein:

Figure 1 is a side elevational view of this invention with the cover plate removed;

Figure 2 is an elevational view of the opposite side of this device;

Figure 3 is a top plan view of this invention;

Figure 4 is a cross-sectional view taken on the line 4—4 of Figure 1;

Figure 5 is a cross-sectional view taken on the line 5—5 of Figure 1;

Figure 6 is a cross-sectional view taken on the line 6—6 of Figure 1; and

Figure 7 is a sectional view showing the details of the pitman bearing and lubrication connection therefor taken substantially on the plane indicated by the line 7—7 of Figure 1.

This invention, generally designated by the character reference 10 is a carcass splitting device, such as is conventionally employed in the packing house industry. The device is suspended by a counter-weighted flexible carrying member, which is carried by a pulley disposed on a raised horizontal trolley. A carcass is suspended from the trolley and is divided into two halves by a power driven saw.

The carcass splitter 10 comprises a casing or housing 12 of an elliptical configuration. Tapped bosses 14 are provided along the inner surface of the casing for accommodating conventional fasteners for securing a cover plate to the casing. A conventional electric motor 16 is secured to the closed side of the casing by means of an integral extension or shelf 18 which extends from the top of the casing in an inclined plane to terminate in a horizontal section 20 to which the motor is bolted as at 22. The extending shelf 18 is provided with a downwardly disposed angular extension 24, disposed in front of the motor and shielding the same from the spray of material.

The motor 16 is conventionally provided with an armature shaft 17 extending through an opening 19 in the closed side of the casing. A flywheel 23 is keyed on the extending end of the shaft and is provided with a series of circumferentially disposed balancing openings 25.

An eccentric pin 26 extends laterally from the flywheel and is secured to one end of a crankshaft or pitman 28. In this respect, a ball bearing assembly 30 is disposed between the flywheel and the end of the pitman, the inner race of the ball bearing being pressed onto the eccentric pin 26 with the end of the pitman pressed onto the outer race of the ball bearing, the same being covered by a bearing cover plate 32 having a grease fitting 33 therein.

The opposite end of the pitman or crankshaft 28 is connected to a slide arm 34 by means of a bearing stud 36, the connection being provided with a ball bearing assembly 38.

Guide means 40 is provided for the slide arm or actuating arm 34 and comprises a sectional guide member 42 which is bolted as at 44 to the inner surface of the closed side of the casing. The guide member is formed with a horizontally disposed longitudinally extending pair of guide rails 46 and 48 within which travels the arm 34, as seen in Figures 1 and 4.

A saw arm assembly 50 is securely attached to the casing 12 and comprises an arcuate saw arm 52 which is bolted at one end, as at 54 and 56 to the casing or frame. The opposite end of the saw arm terminates in a guide eye or member 58. A conventional saw blade 60 is secured as at 62 to the extending end of the slide arm 34 and has its opposite end slidably inserted in the guide end 58 of the saw arm. A pair of guide arms or brackets 64 and 66 depend from the saw arm 52 in a converging angle of inclination and are slotted at their lower ends to slidably accommodate the straight edge of the saw blade.

A vertically extending handle 68 and a horizontally disposed handle 70 are provided to enable an operator to adjust the machine vertically and horizontally. A conventional switch 72 controls the operation of the motor and is mounted on the rear portion of the motor support or mount 20. A suspension eye 74 vertically extends from the motor mounting shelf 20 and a swivel nut 76 disposed at one end of a cable or similar flexible carrying member 78 is detachably associated with the eye, as seen in Figure 2, the opposite end of the cable 78 being counter-weighted and passing over a pulley on the carcass carrying trolley, in accordance with conventional practice.

In operation, the operator may easily guide the machine through the carcass, employing the handle 68 and 70, the saw arm and blade structure being inclined forwardly and downwardly, so that the operator merely has to guide the saw to form the longitudinal division in the carcass from the rump downwardly. When the motor is actuated, through the medium of the switch, the pitman or crankshaft, eccentrically attached at its inner end to the flywheel, will impart a reciprocatory movement in the saw blade 60, guided in its movement by the guide arm and guide brackets. Of course, the operator can easily raise or lower the saw or turn the saw at any lateral angle or at any inclined position, according to the nature of the work, by means of the operating handle and the swivel connection in a manner of attachment.

It is to be particularly noted that the saw-arm assembly 50 is arcuately configured and so contoured or streamlined so that there are no square corners. Thus, the saw is much more convenient and efficient in operation since vibration of the saw is greatly eliminated and movement of the saw assembly through the carcass is easier and faster. Also, the saw assembly is easier to keep clean.

Since other uses and embodiments of the instant invention are possible, it is to be understood that changes in the design, arrangement of parts and the like structural transformation may be carried out, the same coming within the spirit and scope of the appended claims.

Having described the invention, what is claimed as new is:

1. A carcass splitter comprising an elliptical housing, a back wall secured on said housing, a front cover detachably secured on said housing, a laterally extending shelf secured on the top of said housing, a motor mounted on said shelf adjacent one end of said housing, said back having an opening therein, a shaft of said motor extending through said opening, a flywheel keyed on said shaft in said housing, an eccentric pin mounted on said flywheel and extending laterally therefrom, a longitudinally extending guide mounted on said back wall at the opposite end from said flywheel, said guide including parallel guide rails, a slide arm mounted in said guide rails, a pitman connecting said eccentric pin to said slide arm, a saw arm attached to said housing, a saw slidably mounted on said saw arm, a driving connection between said slide arm and said saw.

2. A carcass splitter comprising an elliptical housing, a back wall secured on said housing, a front cover detachably secured on said housing, a laterally extending shelf secured on the top of said housing, a motor mounted on said shelf adjacent one end of said housing, said back having an opening therein, a shaft of said motor extending through said opening, a flywheel keyed on said shaft in said housing, an eccentric pin mounted on said flywheel and extending laterally therefrom, a longitudinally extending guide mounted on said back wall at the opposite end from said flywheel, said guide including parallel guide rails, a slide arm mounted in said guide rails, a pitman connecting said eccentric pin to said slide arm, a saw arm attached to said housing, a saw slidably mounted on said saw arm, a driving connection between said slide arm and said saw, a downwardly disposed angular extension on said shelf disposed in front of said motor in shielding relation between said motor and said saw.

3. A carcass splitter comprising an elliptical housing, a back wall secured on said housing, a front cover detachably secured on said housing, a laterally extending shelf secured on the top of said housing, a motor mounted on said shelf adjacent one end of said housing, said back having an opening therein, a shaft of said motor extending through said opening, a flywheel keyed on said shaft in said housing, an eccentric pin mounted on said flywheel and extending laterally therefrom, a longitudinally extending guide mounted on said back wall at the opposite end from said flywheel, said guide including parallel guide rails a slide arm mounted in said guide rails, a pitman connecting said eccentric pin to said slide arm, an arcuate saw arm securely attached to said housing, a guide eye in the end of the arm remote from the housing, a pair of guide arms depending from said saw arm in a converging angle of inclination, a guide slot at the lower end of each of said guide arms, a saw blade slidably inserted in said guide eye and slots, and a driving connection between said slide arm and said saw.

HOWARD L. DAVIS.

References Cited in the file of this patent

UNITED STATES PATENTS

| Number | Name | Date |
|---|---|---|
| 1,550,342 | Cogley | Aug. 18, 1925 |
| 1,617,410 | Meyer | Feb. 15, 1927 |
| 2,064,676 | MacLeod | Dec. 15, 1936 |
| 2,327,167 | Bratek et al. | Aug. 17, 1943 |